US012672597B2

(12) United States Patent　　(10) Patent No.: US 12,672,597 B2
Childs et al.　　(45) Date of Patent: Jul. 7, 2026

(54) AGRICULTURAL IMPLEMENT SYSTEM WITH A CONTROLLER THAT CONTROLS TRAVEL AND POWER TAKE OFF COUPLING IN RESPONSE TO PLUG CONDITIONS

(71) Applicant: CNH Industrial America LLC, New Holland, PA (US)

(72) Inventors: Albert Childs, Denver, PA (US); Kevin M. Smith, Narvon, PA (US); Geert P. Mortier, Ghent (BE)

(73) Assignee: CNH Industrial America LLC, New Holland, PA (US)

( * ) Notice: Subject to any disclaimer, the term of this patent is extended or adjusted under 35 U.S.C. 154(b) by 1016 days.

(21) Appl. No.: 17/355,923

(22) Filed: Jun. 23, 2021

(65) Prior Publication Data

US 2022/0408632 A1　　Dec. 29, 2022

(51) Int. Cl.
　　*A01B 71/06*　　(2006.01)
　　*A01D 75/18*　　(2006.01)
　　　　(Continued)

(52) U.S. Cl.
　　CPC .......... *A01B 71/06* (2013.01); *A01F 15/0841* (2013.01); *A01F 15/10* (2013.01); *A01D 75/182* (2013.01)

(58) Field of Classification Search
　　CPC ...... A01F 15/00–15/18; A01F 15/0841; A01F 15/10; A01B 71/00–71/08;
　　　　(Continued)

(56) References Cited

U.S. PATENT DOCUMENTS 4,332,127 A * 6/1982 Staiert ................ A01D 41/1274
　　　　　　　　　　　　　　　　460/3
6,942,595 B2 9/2005 Hrazdera
　　　　　　　(Continued)

FOREIGN PATENT DOCUMENTS

WO　　WO-2013152991 A1 * 10/2013 ............. A01D 75/20

OTHER PUBLICATIONS

Extended European Search Report for EP application 22179903.4 dated Nov. 15, 2022 (7 pages).

*Primary Examiner* — Joseph M Rocca
*Assistant Examiner* — Madeline I Runco
(74) *Attorney, Agent, or Firm* — Buchanan Ingersoll & Rooney PC

(57) ABSTRACT

An agricultural implement system includes: a work vehicle with an engine carried by a vehicle chassis and a PTO coupler coupled to the engine; an agricultural implement including a power take-off coupled to the PTO coupler, a feeder configured to feed crop material, a pickup configured to convey crop material to the feeder, and a plug sensor associated with at least one of the feeder or the pickup and configured to output a plug signal; and a control system including a controller coupled to the plug sensor. The controller is configured to: receive the plug signal to determine a plug condition exists; output a PTO decouple signal when the plug condition exists; output a stop signal when the plug condition exists; and output a plug clear signal so the power take-off is recoupled to the PTO coupler and the work vehicle resumes moving when the plug condition no longer exists.

16 Claims, 3 Drawing Sheets

(51) Int. Cl.
    *A01F 15/08*         (2006.01)
    *A01F 15/10*         (2006.01)

(58) Field of Classification Search
    CPC ....... A01B 61/00–61/048; A01B 71/06; A01D
                89/00–89/008; A01D 75/182
    See application file for complete search history.

(56) References Cited

U.S. PATENT DOCUMENTS

| | | | |
|---|---|---|---|
| 7,640,721 B2 | 1/2010 | Viaud et al. | |
| 8,056,314 B1 * | 11/2011 | Anstey .................. | A01F 15/106 |
| | | | 56/364 |
| 8,311,709 B2 | 11/2012 | Vanhercke et al. | |
| 8,517,158 B2 | 8/2013 | Viaud | |
| 8,751,115 B2 | 6/2014 | Derscheid | |
| 10,060,486 B2 * | 8/2018 | Omran .................... | B60K 25/02 |
| 10,980,184 B2 * | 4/2021 | Naeyaert .............. | A01B 61/025 |
| 2003/0069102 A1 * | 4/2003 | Coenen ................ | A01B 61/025 |
| | | | 475/1 |
| 2010/0036569 A1 | 2/2010 | Hel et al. | |
| 2011/0191001 A1 * | 8/2011 | Viaud ................... | A01F 15/106 |
| | | | 702/182 |
| 2017/0142906 A1 * | 5/2017 | Benevelli ............ | A01F 15/0841 |
| 2019/0059200 A1 | 2/2019 | van der Bijl et al. | |
| 2019/0224934 A1 * | 7/2019 | Ostermann ............. | A01F 15/07 |
| 2019/0289771 A1 * | 9/2019 | Lang ...................... | A01B 71/06 |
| 2020/0008359 A1 * | 1/2020 | Thies ................. | A01F 15/0841 |
| 2020/0260645 A1 | 8/2020 | Seimetz et al. | |
| 2021/0015049 A1 * | 1/2021 | Naeyaert ............... | A01D 69/08 |
| 2021/0127581 A1 | 5/2021 | McClure | |
| 2021/0137020 A1 | 5/2021 | De Leener et al. | |
| 2022/0287240 A1 * | 9/2022 | Jones ................... | A01B 59/004 |

* cited by examiner

AGRICULTURAL IMPLEMENT SYSTEM WITH A CONTROLLER THAT CONTROLS TRAVEL AND POWER TAKE OFF COUPLING IN RESPONSE TO PLUG CONDITIONS

BACKGROUND OF THE INVENTION

The present invention pertains to agricultural implement systems, and more specifically, to a plug detection system for an agricultural implement.

Agricultural implements, such as balers, choppers, etc., may be used to pickup and handle crop material from a field. Such agricultural implements typically include a pickup, which may have a plurality of rotating tines for picking up crop material, that feeds crop material to a feeder, which feeds the crop material to one or more other elements of the implement. When the agricultural implement is a baler, the baler consolidates and packages crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw, such as wheat or oat straw, which is to be picked up by the baler. After the crop material has sufficiently dried, a baler which is typically towed by an agricultural vehicle will pick up the crop material and form it into bales.

A baler or other agricultural implement may become plugged if, for example, the pickup and/or feeder receives a sudden increase in crop volume or a large foreign object. When a plug occurs, the various subsystems of the implement may not operate correctly and/or become damaged. To reduce the risk of damage to the various subsystems, the plug should be removed. The operator may stop the tractor and remove the plugged crop material and/or foreign object upon becoming aware of the plug. It can be difficult for an operator to know when a plug is present and, further, it can be time-consuming for an operator to know how to remove a plug and/or take some or all of the steps needed to remove the plug. Once the plug is removed, operation of the implement may be resumed.

What is needed in the art is a way to reduce the detrimental effects of a plug on an agricultural implement.

SUMMARY OF THE INVENTION

Exemplary embodiments disclosed herein provide a controller that is configured to determine a plug condition exists, output a PTO decouple signal when the plug condition exists, output a stop signal when the plug condition exists, determine the plug condition no longer exists, and output one or more plug clear signals when the plug condition no longer exists.

In some exemplary embodiments provided according to the present disclosure, an agricultural implement system includes: a work vehicle with a vehicle chassis; an engine carried by the vehicle chassis, and a PTO coupler coupled to the engine; an agricultural implement carried by the work vehicle and including a chassis, a power take-off coupled to the PTO coupler, a feeder configured to feed crop material, a pickup configured to convey crop material to the feeder, and at least one plug sensor associated with at least one of the feeder or the pickup and configured to detect a plug is present and output a plug signal; and a control system including a controller operably coupled to the at least one plug sensor. The controller is configured to: receive the plug signal to determine a plug condition exists; output a PTO decouple signal so the power take-off is decoupled from the PTO coupler when the plug condition exists; output a stop signal so the work vehicle stops moving when the plug condition exists; determine the plug condition no longer exists; and output at least one plug clear signal so the power take-off is recoupled to the PTO coupler and the work vehicle resumes moving when the plug condition no longer exists.

In some exemplary embodiments provided according to the present disclosure, an agricultural implement includes: a chassis; a power take-off carried by the chassis; a feeder configured to feed crop material; a pickup configured to convey crop material to the feeder; at least one plug sensor associated with at least one of the feeder or the pickup and configured to detect a plug is present and output a plug signal; and a controller operably coupled to the at least one plug sensor and configured to: receive the plug signal to determine a plug condition exists; output a PTO decouple signal so the power take-off is decoupled from a power source when the plug condition exists; output a stop signal so movement of the agricultural implement stops when the plug condition exists; determine the plug condition no longer exists; and output at least one plug clear signal so the power take-off is recoupled to the power source and the agricultural implement resumes moving when the plug condition no longer exists.

In some exemplary embodiments provided according to the present disclosure, a method of controlling an agricultural implement system including a work vehicle and an agricultural implement is provided. The work vehicle includes a PTO coupler coupled to an engine. The agricultural implement includes a power take-off coupled to the PTO coupler, a pickup, and a feeder. The method is performed by a controller and includes: receiving a plug signal from at least one plug sensor to determine a plug condition exists, the at least one plug sensor being associated with at least one of the pickup or the feeder; outputting a PTO decouple signal so the power take-off is decoupled from the PTO coupler when the plug condition exists; outputting a stop signal so the work vehicle stops moving when the plug condition exists; determining the plug condition no longer exists; and outputting at least one plug clear signal so the power take-off is recoupled to the PTO coupler and the work vehicle resumes moving when the plug condition no longer exists.

One possible advantage that may be realized by exemplary embodiments disclosed herein is that the controller can determine when a plug condition exists and cause the power take-off to decouple from a power source, such as the PTO coupler, and the implement to stop moving quickly so the severity of the plug can be reduced, which can make the plug easier to remove, and the plug can be removed before causing too much damage to components of the implement.

Another possible advantage that may be realized by exemplary embodiments disclosed herein is that the controller can determine the plug condition no longer exists and cause the power take-off to recouple with the power source and the implement to start moving again so operation of the implement can continue.

Yet another possible advantage that may be realized by exemplary embodiments disclosed herein is that the controller can output one or more signals to a display to alert an operator that the plug condition exists and guide the operator on how to remove the plug.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle and/or baler are usually determined with reference to the direction of forward operative travel of the agricultural vehicle, but they should not be construed as limiting.

Figure 1:
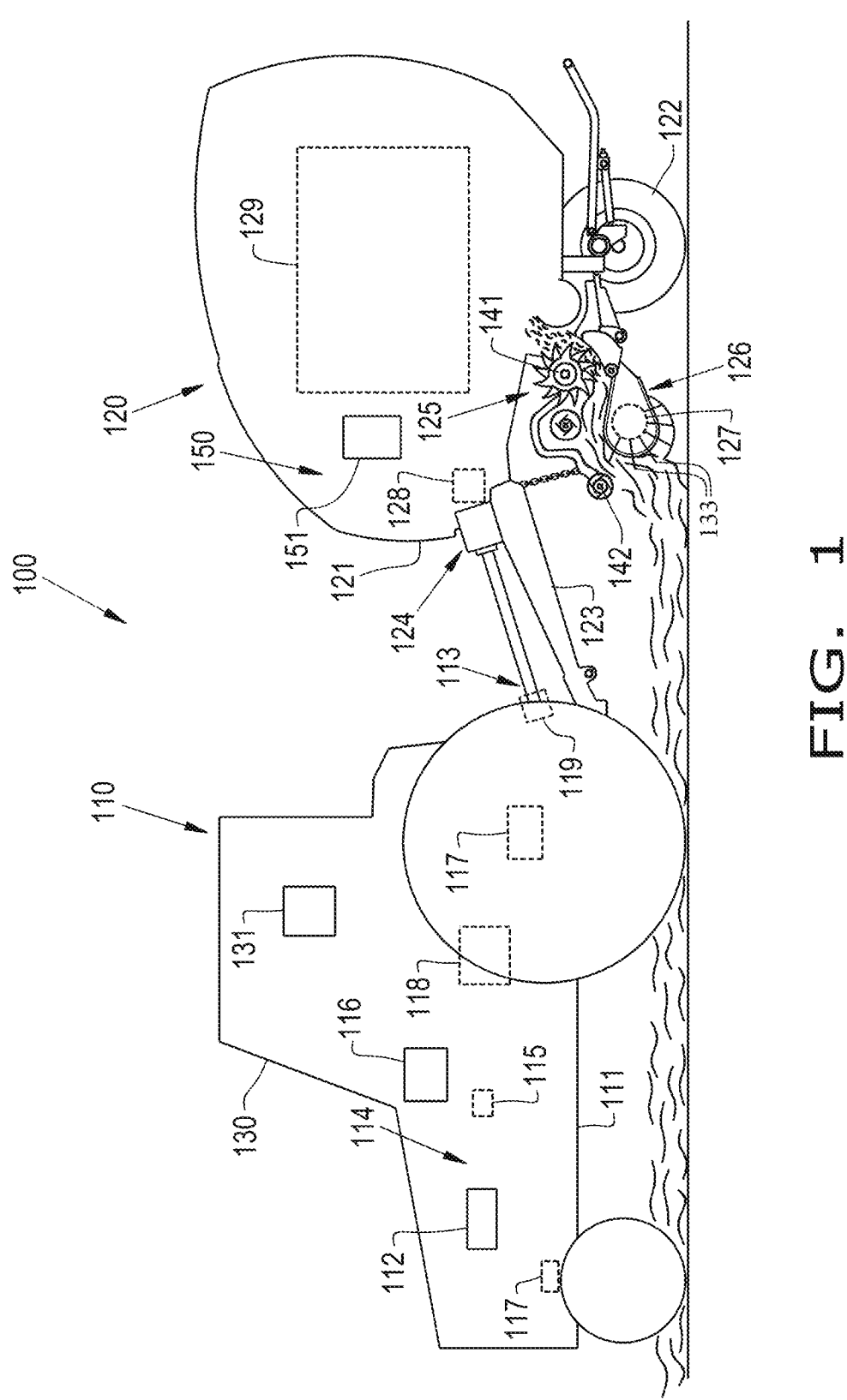
FIG. 1 illustrates a schematic view of an exemplary embodiment of an agricultural implement system, the system includes a work vehicle in the form of a tractor and an agricultural implement in the form of a baler, provided according to the present disclosure.
Figure 2:
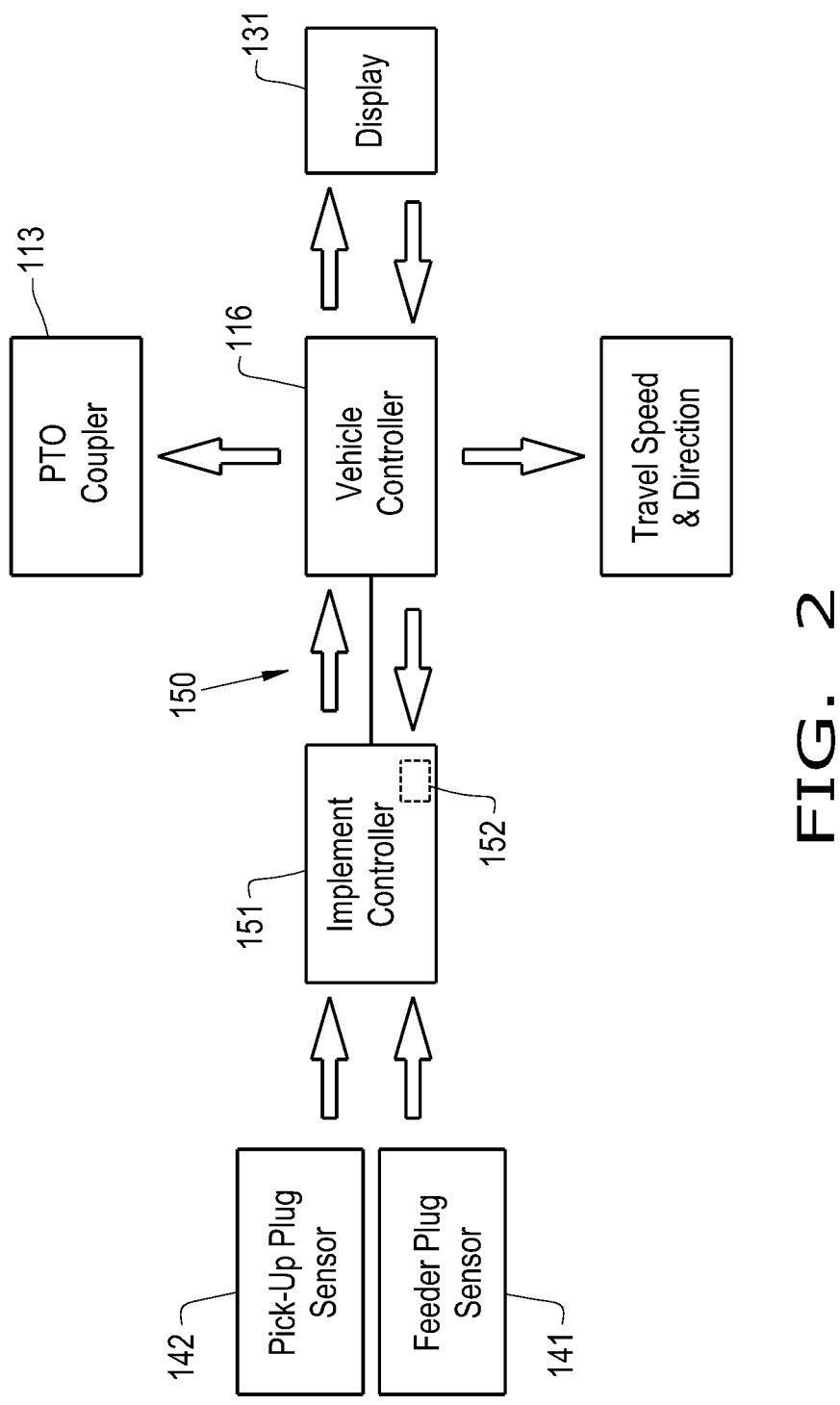
FIG. 2 illustrates a schematic view of the agricultural implement system of FIG. 1.

Referring now to the drawings, and more particularly to FIGS. 1-2, there is shown a schematic view of an agricultural implement system 100 that gathers crop material from a field. The agricultural implement system 100 generally includes a work vehicle 110, illustrated in the form of a tractor, which carries an agricultural implement 120, illustrated in the form of a baler, in a forward direction of travel. It should be appreciated that while the work vehicle 110 is illustrated and described as being in the form of a tractor, the work vehicle 110 can be other types of work vehicles that can carry the agricultural implement. Similarly, while the agricultural implement 120 is illustrated and described as being in the form of an agricultural baler, the agricultural implement 120 can be a different type of agricultural implement including, but not limited to, a forage harvester, a windrower, etc. The agricultural implement 120 may also be a self-propelled implement, such as a combine harvester. It should thus be appreciated that the agricultural implement system 100 provided according to the present disclosure can include various types of work vehicles and/or agricultural implements.

The work vehicle 110 may be an agricultural tractor, such as an autonomous, semi-autonomous, or operator-driven tractor. The vehicle 110 may include a vehicle chassis 111, front and rear wheels and/or tracks, a prime mover in the form of an engine 112, and a power take off (PTO) coupler 113 including a PTO output shaft. The vehicle 110 may further include a drive system 114, one or more sensors 115, and a controller 116 with a memory. Since the work vehicle 110 may or may not carry an operator, the work vehicle 110 may or may not include an operator cab 130 with a display 131 disposed therein.

The drive system 114 may control the speed and direction of the work vehicle 110. The drive system 114 may include the engine 112, a drivetrain, a steering assembly, and a braking system including one or more brakes 117. The one or more sensors 115 may comprise a positioning sensor, such as a global positioning system (GPS) sensor or the like, a speed sensor, an inclinometer sensor, a moisture content sensor, etc. The controller 116 may be operably coupled to the PTO coupler 113, the drive system 114, the sensor(s) 115, and the display 131 for controlling the various operations of the work vehicle 110.

The agricultural implement 120, when in the form of a baler, produces crop material bales and deposits the bales onto the field. As shown, the implement 120 is configured as a round baler configured to generate round bales. However, in some embodiments, the implement 120 may be a different type of baler, including being configured to generate square or rectangular bales, or a different type of agricultural implement altogether. The implement 120 may generally include a chassis 121, wheels 122, a hitch or tongue 123 pivotally connected to the work vehicle 110, and a power take-off 124 coupled to a power source, which may be the engine 112. The power take-off 124 may couple to the power source (engine 112) by coupling to the PTO coupler 113 of the work vehicle 110, which is coupled to the engine 112. It should be appreciated that the power source 112 does not need to be the engine of the work vehicle 110, and may be a different source of mechanical power. The implement 120 includes a feeder 125 configured to feed crop material, e.g., further into the implement 120, and a pickup 126, which may include a pickup roll 127 carrying a plurality of tines 133, that is configured to convey crop material to the feeder 125, e.g., during rotation of the pickup roll 127 and the tines 133. While the pickup 126 is illustrated and described as including a pickup roll 127 and tines 133, the pickup 126 may have other configurations and/or functions, e.g., as a header for a combine harvester. When provided in the form of a baler, the implement 120 may also include a bale chamber 129 that is supplied with crop material by the feeder 125 and configured to form a bale from supplied crop material. The baler 120 may also include various operational parameter sensors including a positioning sensor, such as a global positioning system (GPS) sensor or the like, a speed sensor, an inclinometer sensor, a moisture content sensor, etc.

In a baling operation, the pickup 126 lifts the crop material from the field and moves the crop material rearwardly toward the feeder 125. The feeder 125 processes the crop material and moves the crop material rearwardly toward the bale chamber 129, where the crop material is rolled into a bale of a predetermined size. The bale chamber 129 may be in the form of a continuously variable bale chamber 129. Hence, the bale chamber 129 may include multiple rolls or rollers, one or more cylinders and/or pivot arms coupled to the movable rollers, at least one belt, and a bale density pressure mechanism. Together, the rollers and the belt(s) may create a round circulating chamber which expands in between an empty bale position and a full bale position for engaging and rolling the bale. When the bale reaches a predetermined size, the bale is wrapped with a wrapping material by the wrapping mechanism or wrapper. Once wrapped, a tailgate opens to allow the bale to roll out of the bale chamber 129 to be deposited onto the field or onto a bale holding device which is connected to the baler 120.

In known agricultural implements that include feeders and pickups, whether in the form of a baler or otherwise, a plug of material can detrimentally affect operation. In some cases, the plug of material can cause the pickup and/or the feeder to stop rotating, which disrupts the feed of crop material from the feeder to another element of the implement. In such a case, the implement essentially plows through crop material on the field without appreciably handling the crop material and potentially damaging the crop material. Such a plowing event also generally results in more severe plugs by packing the plug in the space, making the plug more difficult to remove. The plug may not only disrupt handling of the crop material by the pickup and/or the feeder, but can also result in torque overload in the drive system of the pickup and/or the feeder due to the plug preventing rotation of one or more drive components. Thus, an unaddressed plug of material can detrimentally affect implement function and also damage components of the implement.

To address some of the previously described issues, the implement 120 includes at least one plug sensor, illustrated as a feeder plug sensor 141 and a pickup plug sensor 142, associated with the feeder 125 and/or the pickup 126. As illustrated, the feeder plug sensor 141 is associated with the feeder 125 to detect plugs at the feeder 125 and the pickup plug sensor 142 is associated with the pickup 126 to detect plugs at the pickup 126. It should be appreciated that while two plug sensors 141, 142 are illustrated and described herein, in some embodiments only one plug sensor, e.g., only the feeder plug sensor 141 associated with the feeder 125 or the pickup plug sensor 142 associated with the pickup 126, is provided according to the present disclosure. The plug sensor(s) 141, 142 is configured to detect a plug is present, due to crop material or otherwise, and output a plug signal when the plug is present.

The agricultural implement system 100 includes a control system 150 which includes the previously described controller 116, which may be referred to as a "vehicle controller," carried by the vehicle chassis 111 and another controller 151, which may be referred to as an "implement controller," that is carried by the chassis 121 of the implement 120 and coupled to an implement memory 152. It should be appreciated that reference to one or more of "the controllers" 116, 151 may also generally refer to the "control system" 150, which includes the one or more controllers 116, 151, so any function described as being performed by one or both of the controllers 116, 151 can be similarly performed by a control system including the controllers 116, 151 and/or other controllers. One or more controllers 116, 151 of the control system 150 are operably coupled to the plug sensor(s) 141, 142. In some embodiments, the implement controller 151 is operably coupled to the plug sensors 141, 142 and is also operably coupled to the vehicle controller 116 via a communication interface, such as an ISOBUS communication interface. In this respect, the vehicle controller 116 may be operably coupled to the plug sensors 141, 142 indirectly via the implement controller 151, but it should also be appreciated that the vehicle controller 116 may be directly operably coupled to the plug sensors 141, 142 according to the present disclosure.

When the feeder 125 and/or the pickup 126 becomes plugged, the respective plug sensor(s) 141, 142 sends a corresponding plug signal to the implement controller 151 and/or the vehicle controller 116. If the plug sensors 141, 142 are only operably coupled to the implement controller 151, the implement controller 151 may output the plug signal to the vehicle controller 116. One or both of the controllers 116, 151 is configured to: receive the plug signal to determine a plug condition exists; output a PTO decouple signal so the power take-off 124 is decoupled from the power source, which may be the engine 112, when the plug condition exists; output a stop signal so movement of the implement 120 stops when the plug condition exists, which may be because the work vehicle 110 stops moving; determine the plug condition no longer exists; and output at least one plug clear signal so the power take-off 124 is recoupled to the power source, e.g., the engine 112, and the implement 120 (and, in some embodiments, the work vehicle 110) resumes moving when the plug condition no longer exists. It should be appreciated that the implement controller 151 may be configured to perform the previously described functionality alone or in combination with the vehicle controller 116. It should also be appreciated that the vehicle controller 116 may be configured to perform the previously described functionality alone or in combination with the implement controller 151. It should thus be appreciated that, in some embodiments, only one controller 116, 151 is required and, in some embodiments, two or more controllers 116, 151 may be used according to the present disclosure.

In some embodiments, one or more of the plug sensors 141, 142 may be in the form of a position sensor for determining the angle of the pickup 126 and/or a rotational speed sensor for measuring the rotational speed of the pickup roll 127 of the pickup 126. In some embodiments, one or more of the plug sensors 141, 142 may be in the form of rotational speed sensor which is located on the feeder 125 for measuring the rotational speed of the feeder 125. As illustrated in FIG. 1, the plug sensor 141 is a feeder plug sensor associated with the feeder 125 and configured to output the plug signal as a signal corresponding to the rotational speed of the feeder 125. The controller 116, 151 may be configured to determine a plug condition exists if the rotational speed of the feeder 125 falls below a defined rotational speed value, which indicates that the feeder 125 is rotating slower than it should due to a plug, so the plug signal is a signal corresponding to a rotational speed of the feeder 125 that is below the defined rotational speed value. Similarly, the plug sensor 142 may be a pickup plug sensor associated with the pickup 126 and configured to output the plug signal as a signal corresponding to the angle of the pickup 126 and/or the rotational speed of the pickup roll 127. The controller 116, 151 may be configured to determine a plug condition exists if the angle of the pickup 126 exceeds a defined angle value range and/or the rotational speed of the pickup roll 127 falls below a defined rotational speed value, which can both indicate that the pickup 126 is operating abnormally due to a plug, so the plug signal is a signal corresponding to the angle of the pickup 126 exceeding the defined angle value range and/or the rotational speed of the pickup roll 127 falling below the defined rotational speed value. Other ways of determining that a plug condition exists include, but are not limited to: measuring a position and/or a movement of a windguard; using image recognition to detect motion or lack of motion of crop in an area around the pickup 126; determining a torque value or a change in torque on the PTO coupler 113 exceeds a defined value, which indicates a clutch has tripped; monitoring vibration or motion in an area around one or more knives and/or a feeder floor area, with a lack of vibration indicating a lack of crop flow; measuring a height of crop on top of the pickup 126; or determining a speed of a clutch using an input speed sensor placed before the clutch and a downstream speed sensor placed after the clutch to determine the presence of the clutch tripping. It should thus be appreciated that the plug sensor(s) 141, 142 and the controller 116, 151 can be configured in a variety of ways to determine a plug condition exists.

The controller 116, 151 may output a PTO decouple signal so the power take-off 124 is decoupled from the power source, such as engine 112, in a variety of ways. In some embodiments, the vehicle controller 116 outputs the PTO decouple signal so motive force is no longer supplied to the PTO coupler 113 from the engine 112, which also acts to decouple the power take off 114 from the engine 112. The PTO coupler 113 may be decoupled from the engine 112, for example, by adjusting a gearbox 118 coupling the PTO coupler 113 to the engine 112, as is known. Alternatively, or in addition, the output PTO decouple signal may cause adjustment of a clutch or other transmission element, such as a hydrodynamic torque converter, to decouple the PTO coupler 113 from the engine 112, as is known. In some embodiments, the work vehicle 110 includes a coupler actuator 119 that is coupled to the PTO coupler 113, operably coupled to the controller 116, 151, and configured to decouple the PTO coupler 113 from the power take-off 124 upon receiving the PTO decouple signal and recouple the PTO coupler 113 to the power take-off 124 upon receiving the at least one plug clear signal. The coupler actuator 119 may decouple and recouple the PTO coupler 113 and the power take-off 124 by, for example, moving one or more elements, such as a spline, configured to couple the PTO coupler 113 and the power take-off 124 together. In some embodiments, the implement 120 includes a PTO actuator 128 coupled to the power take-off 124, operably coupled to the controller 116, 151, and configured to decouple the power take-off 124 from the PTO coupler 113 upon receiving the PTO decouple signal and recouple the power take-off 124 to the PTO coupler 113 upon receiving the at least one plug clear signal. The PTO actuator 128 may decouple and recouple the power take-off 124 and the PTO coupler 113 by, for example, moving one or more elements configured to couple the power take-off 124 to the PTO coupler 113. It should be appreciated that the controller 116, 151 can also be configured in a variety of additional or alternative ways to cause the power take-off 124 to decouple from and recouple to the power source (the engine 112) and/or the PTO coupler 113 according to the present disclosure.

The controller 116, 151 may output the stop signal so the work vehicle 110 stops moving, or movement of the implement 120 stops, when the plug condition exists in a variety of ways. Similarly, the controller 116, 151 may output the at least one plug clear signal so the work vehicle 110, and/or the implement 120, resumes moving when the plug condition no longer exists. In some embodiments, the controller 116, 151 is operably coupled to a transmission of the work vehicle 110, e.g., a continuously variable transmission, that is coupled to the engine 112 and controls the transmission so the work vehicle 110 stops moving upon the transmission receiving the stop signal, e.g., by requesting a zero speed from the continuously variable transmission, which may set the transmission into neutral. In some embodiments, the controller 116, 151 is operably coupled to the engine 112, which is configured to reduce an engine speed, i.e., a rotational speed of the output shaft, upon receiving the stop signal and to increase the engine speed upon receiving the at least one plug clear signal. In this respect, the controller 116, 151 can control the power and torque output of the engine 112 in response to determining whether a plug condition exists or not. In some embodiments, the controller 116, 151 is operably coupled to the braking system with brakes 117, which is configured to activate to stop the work vehicle 110 upon receiving the stop signal and release upon receiving the at least one plug clear signal so the work vehicle 110 may continue pulling the implement 120. It should be appreciated that the controller 116, 151 can be configured in a variety of additional or alternative ways to cause movement of the work vehicle 110 and/or the implement 120 to stop or resume according to the present disclosure.

The controller 116, 151 may be configured to determine the plug condition no longer exists in a variety of ways. In some embodiments, the controller 116, 151 is configured to receive a cleared plug signal from the plug sensor(s) 141, 142 to determine that the plug condition no longer exists. For example, the plug sensor(s) 141, 142 may be configured to output the cleared plug signal to the controller 116, 151 upon the plug condition at the feeder 125 and/or the pickup 126 clearing. The plug sensor(s) 141, 142 may be configured to detect the plug condition no longer exists in a variety of ways, e.g., by detecting that resistance to rotation of the feeder 125 and/or the pickup roll 127 is below a defined value, indicating that a plug is not interfering with rotation, and/or by detecting that the pickup 126 has returned to a defined baseline position. In this respect, the cleared plug signal from the plug sensor(s) 141, 142 can be signals corresponding to the relevant parameter, e.g., rotational speed of the feeder 125 and/or the pickup roll 127 and/or the angle of the pickup 126, falling outside the range that indicates the plug condition is present. Alternatively, or in addition, the controller 116, 151 can be configured to determine that the plug condition no longer exists if the power take-off 124 successfully re-engages without tripping any clutches and crop material flow commences and/or by analyzing one or more image signals to visually confirm that the plug condition no longer exists. It should thus be appreciated that, in some embodiments, the controller 116, 151 is configured to determine the plug condition no longer exists based on one or more signals from the plug sensor(s) 141, 142.

Figure 3:
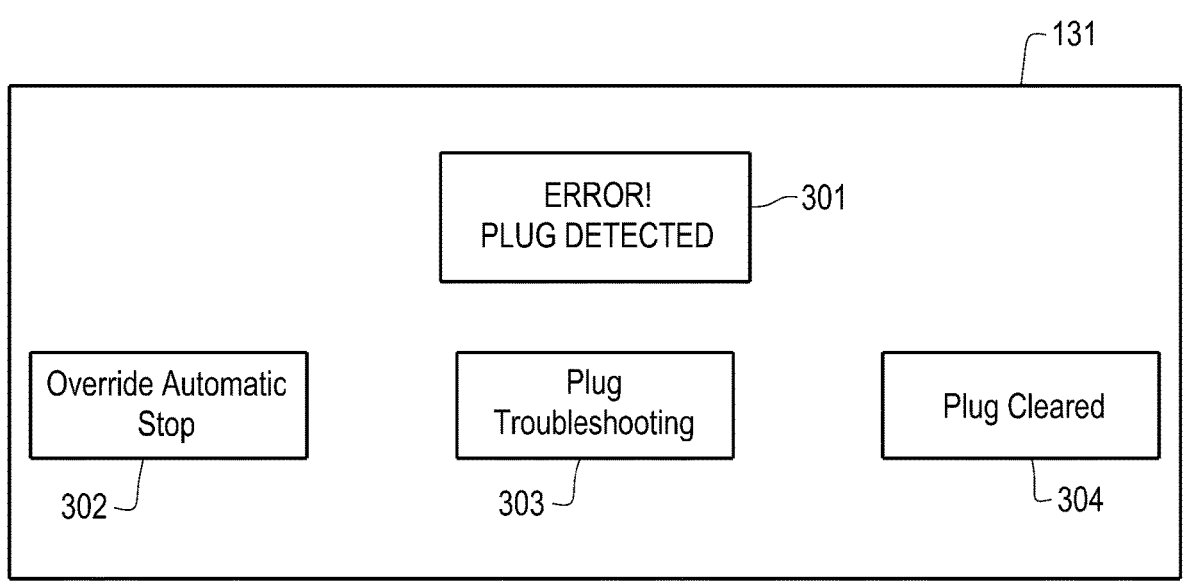
FIG. 3 illustrates an exemplary embodiment of a display that may be incorporated in the work vehicle of FIGS. 1-2 to show when a plug condition exists.

In some embodiments, the display 131 that is operably coupled to the controller 116, 151 is configured to output a cleared plug signal to the controller 116, 151, which is configured to determine the plug condition no longer exists upon receiving the cleared plug signal from the display 131. Referring now to FIG. 3, an exemplary embodiment of the display 131 is illustrated. In some embodiments, the controller 116, 151 is configured to output a plug alert signal to the display 131 so the display 131 presents a plug alert 301 when the plug condition exists. As illustrated, the plug alert 301 may indicate to an operator that a plug has been detected and include other icons 302, 303, 304 that the operator can select. One of the icons 302 may be an override icon that, when selected, causes the display 131 to output an override signal to the controller 116, 151 so the controller 116, 151 does not cause movement of the work vehicle 110 and/or the implement 120 to stop. An operator may wish to override automatic stoppage of the work vehicle 110 and/or the implement 120 if, for example, the work vehicle 110 and/or the implement 120 is in a location where it would be difficult to remove the plug from the implement 120, such as on a hill. The icon 303 may be a troubleshooting icon that, when selected, causes the display 131 to output a troubleshooting signal to the controller 116, 151. The controller 116, 151 may be configured to output one or more unplug guide signals to the display 131 responsively to receiving the troubleshooting signal. The output unplug guide signal(s) can cause the display 131 to present various graphics and/or sounds that can help the operator identify where the plug is in the implement 120 and/or how to remove the plug from the implement 120. For example, the output unplug guide signal(s) can cause the display 131 to present a graphic showing the steps for an operator to take to remove the plug from the implement 120. The icon 304 may be a cleared plug icon that, when selected, causes the display 131 to output the cleared plug signal to the controller 116, 151, so the controller 116, 151 may determine that the plug condition no longer exists and then output the one or more plug clear signals, as previously described. It should thus be appreciated that the display 131 can allow an operator to know that a plug condition exists and assist the operator in clearing a plug as well as returning the implement 120 back to normal operation.

From the foregoing, it should be appreciated that the controller(s) 116, 151 provided according to the present disclosure can determine that a plug condition exists in the implement 120 and take actions so motive power is no longer transmitted to the feeder 125 and the pickup 126 and the implement 120 stops moving, which reduces the risks of elements of the implement 120 being damaged and also reduces the risk of crop material being plowed through by the implement 120. The controller(s) 116, 151 can determine the plug condition exists automatically, which reduces (or eliminates) the reliance on an operator recognizing that the plug condition exists. The controller(s) 116, 151 can also help guide an operator through the plug removal procedure. When the plug condition no longer exists, the controller(s) 116, 151 outputs one or more plug clear signals so the power take-off 124 is recoupled to a power source, such as the engine 112, and the implement 120 resumes moving, such as by causing the work vehicle 110 to resume moving, so operation of the agricultural implement system 100 can resume smoothly. It should thus be appreciated that the controller(s) 116, 151 can quickly and conveniently stop operation of the implement 120 when there is a plug and resume operation of the implement 120 when the plug has cleared.

Figure 4:
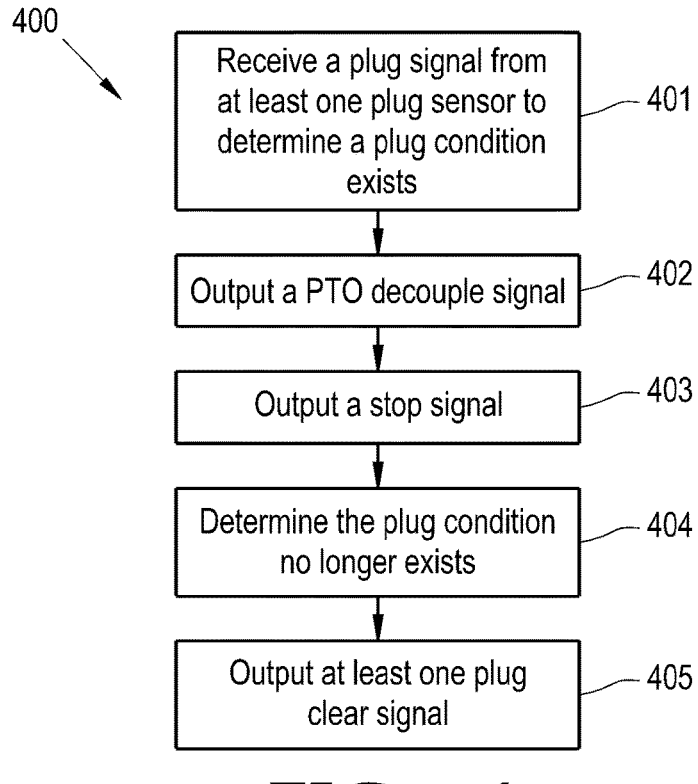
FIG. 4 illustrates a flowchart of an exemplary embodiment of a method of controlling an agricultural implement system, provided in accordance with the present disclosure.

Referring now to FIG. 4, an exemplary embodiment of a method 400 of controlling the agricultural implement system 100 provided according to the present invention is illustrated. The method 400 is performed by a control system 150 comprising a controller 116, 151 and includes: receiving 401 a plug signal from at least one plug sensor 141, 142 to determine a plug condition exists; outputting 402 a PTO decouple signal so the power take-off 124 is decoupled from the engine 112 when the plug condition exists, e.g., by decoupling from the PTO coupler 113; outputting 403 a stop signal so the work vehicle 110 stops moving when the plug condition exists; determining 404 the plug condition no longer exists; and outputting 405 at least one plug clear signal so the power take-off 124 is recoupled to the engine and the work vehicle 110 resumes moving when the plug condition no longer exists. It should be appreciated that the method 400 can further include performing any of the previously described functionality of the control system 150 including the controllers 116, 151.

It is to be understood that one or more of the steps of the method 400 can be performed by the vehicle controller 116 and/or the implement controller 151 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller(s) 116, 151 described herein, such as the method 400, is implemented in software code or instructions which are tangibly stored on a tangible computer readable medium. The controller(s) 116, 151 load(s) the software code or instructions via a direct interface with the computer readable medium or via a wired and/or wireless network. Upon loading and executing such software code or instructions, the controller(s) 116, 151 may perform any of the functionality of the controller(s) 116, 151 described herein, including any steps of the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural implement system, comprising:
   a work vehicle comprising:
      a vehicle chassis;
      an engine carried by the vehicle chassis; and
      a PTO coupler coupled to the engine;
   an agricultural implement carried by the work vehicle, the agricultural implement comprising:
      a chassis;
      a power take-off coupled to the PTO coupler;
      a feeder configured to feed crop material;
      a pickup configured to convey crop material to the feeder; and
      at least one pickup plug sensor coupled to the pickup and configured to (i) detect a plug is present when an angle of the pickup exceeds a predetermined angle value and (ii) output a plug signal based thereon; and
   a control system comprising a controller operably coupled to the at least one plug sensor and configured to:
      receive the plug signal to determine a plug condition exists;
      output a PTO decouple signal so the power take-off is decoupled from the engine when the plug condition exists;
      output a stop signal so the work vehicle stops moving when the plug condition exists;
      determine the plug condition no longer exists;
      output at least one plug clear signal when the plug condition no longer exists; and
      upon receiving the at least one plug clear signal, recouple the power take-off to the engine and resume movement of the work vehicle.

2. The agricultural implement system of claim 1, wherein the controller is carried by the vehicle chassis.

3. The agricultural implement system of claim 1, wherein the work vehicle comprises a coupler actuator coupled to the PTO coupler and operably coupled to the controller, the coupler actuator being configured to decouple the PTO coupler from the power take-off upon receiving the PTO decouple signal to decouple the power take-off from the engine and recouple the PTO coupler to the power take-off upon receiving the at least one plug clear signal to recouple the power take-off to the engine.

4. The agricultural implement system of claim 1, wherein the agricultural implement comprises a PTO actuator coupled to the power take-off and operably coupled to the controller, the PTO actuator being configured to decouple the power take-off from the PTO coupler upon receiving the PTO decouple signal to decouple the power take-off from the engine and recouple the power take-off to the PTO coupler upon receiving the at least one plug clear signal to recouple the power take-off to the engine.

5. The agricultural implement system of claim 1, wherein the controller is operably coupled to the engine, the engine being configured to reduce an engine speed upon receiving the stop signal and increase the engine speed upon receiving the at least one plug clear signal.

6. The agricultural implement system of claim 1, wherein the work vehicle comprises a braking system operably coupled to the controller and configured to activate to stop the work vehicle upon receiving the stop signal and release upon receiving the at least one plug clear signal.

7. The agricultural implement system of claim 1, wherein the control system further comprises an additional controller operably coupled to the controller.

8. The agricultural implement system of claim 7, wherein the additional controller is carried by the chassis of the agricultural implement and is operably coupled to the at least one plug sensor, the additional controller being configured to output the plug signal and the at least one plug clear signal to the controller.

9. The agricultural implement system of claim 1, wherein the work vehicle comprises an operator cab carried by the vehicle chassis and a display disposed in the operator cab and operably coupled to the controller, the controller being configured to output a plug alert signal to the display so the display presents a plug alert when the plug condition exists.

10. The agricultural implement system of claim 9, wherein the controller is configured to determine the plug condition no longer exists upon receiving a cleared plug signal from the display.

11. The agricultural implement system of claim 1, wherein the agricultural implement is an agricultural baler comprising a bale chamber supplied with crop material by the feeder and configured to form a bale from supplied crop material.

12. The agricultural implement system of claim 1, further comprising a feeder plug sensor coupled to the feeder, wherein the feeder plug sensor is configured to (i) detect a feeder plug is present when a feeder rotation rate falls below a predetermined feeder rotational speed value and (ii) output a feeder plug signal based thereon, and wherein the controller is operably coupled to the feeder plug sensor and configured to:

receive the feeder plug signal to determine a feeder plug condition exists;

output a PTO decouple signal so the power take-off is decoupled from the engine when the feeder plug condition exists;

output the stop signal so the work vehicle stops moving when the feeder plug condition exists;

determine the feeder plug condition no longer exists;

output at least one feeder plug clear signal when the feeder plug condition no longer exists; and upon receiving the at least one feeder plug clear signal, recouple the power take-off to the engine and resume movement of the work vehicle.

13. An agricultural implement, comprising:

a chassis;

a power take-off carried by the chassis;

a feeder configured to feed crop material;

a pickup configured to convey crop material to the feeder;

at least one feeder plug sensor coupled to the feeder and configured to (i) detect a feeder plug is present when a feeder rotation rate falls below a predetermined feeder rotational speed value and (ii) output a feeder plug signal based thereon;

a pickup plug sensor coupled to the pickup, wherein the pickup plug sensor is configured to (i) detect a pickup plug is present when an angle of the pickup exceeds a predetermined angle value and (ii) output a pickup plug signal based thereon; and a controller operably coupled to the at least one feeder plug sensor and the pickup plug sensor, wherein the controller is configured to:

receive the feeder plug signal to determine a feeder plug condition exists;

output a PTO decouple signal so the power take-off is decoupled from a power source of a work vehicle when the feeder plug condition exists;

output a stop signal so movement of the agricultural implement stops when the feeder plug condition exists;

determine the feeder plug condition no longer exists;

output at least one feeder plug clear signal when the feeder plug condition no longer exists;

upon receiving the at least one feeder plug clear signal, recouple the power take-off to the power source and resume movement of the work vehicle;

receive the pickup plug signal to determine a pickup plug condition exists;

output the PTO decouple signal so the power take-off is decoupled from the power source when the pickup plug condition exists;

output the stop signal so the work vehicle stops moving when the pickup plug condition exists;

determine the pickup plug condition no longer exists;

output at least one pickup plug clear signal when the pickup plug condition no longer exists; and upon receiving the at least one pickup plug clear signal, recouple the power take-off to the power source and resume movement of the work vehicle.

14. The agricultural implement of claim 13, further comprising a PTO actuator coupled to the power take-off and operably coupled to the controller, the PTO actuator being configured to decouple the power take-off from the power source upon receiving the PTO decouple signal and recouple the power take-off to the power source upon receiving the at least one feeder plug clear signal or the pickup plug clear signal.

15. The agricultural implement of claim 13, further comprising a bale chamber supplied with crop material by the feeder and configured to form a bale from supplied crop material.

16. A method of controlling an agricultural implement system comprising a work vehicle comprising a PTO coupler coupled to an engine and an agricultural implement comprising a power take-off coupled to the PTO coupler, a pickup, and a feeder, the method being performed by a controller of a control system upon loading and executing instructions which are stored on a non-transitory computer readable media, the instructions causing the controller to perform the method comprising:

receiving a plug signal from at least one plug sensor to determine a plug condition exists, the at least one plug sensor being associated with at least one of the pickup or the feeder;

outputting a PTO decouple signal so the power take-off is decoupled from the engine when the plug condition exists;

outputting a stop signal so the work vehicle stops moving when the plug condition exists;

determining the plug condition no longer exists;

outputting at least one plug clear signal when the plug condition no longer exists; and upon receiving the at least one plug clear signal but not before, recouple the power take-off to the engine and resume movement of the work vehicle.

* * * * *